United States Patent
Röhr et al.

(10) Patent No.: US 6,176,711 B1
(45) Date of Patent: Jan. 23, 2001

(54) CONNECTOR FOR ELECTRICALLY COUPLING TWO CURRENT CONTACT LINE SEGMENTS IN END-TO END RELATIONSHIP

(75) Inventors: Michael Röhr, Schwerte; Thomas Kohlenberg; Uwe Schulte, both of Wetter; Klaus-Dieter Oemus, Hemer, all of (DE)

(73) Assignee: Mannesmann AG, Düsseldorf (DE)

( * ) Notice: Under 35 U.S.C. 154(b), the term of this patent shall be extended for 0 days.

(21) Appl. No.: 09/243,283

(22) Filed: Feb. 2, 1999

(30) Foreign Application Priority Data

Feb. 19, 1998 (DE) .............................................. 198 07 792

(51) Int. Cl.$^7$ ...................................................... H01R 4/60
(52) U.S. Cl. .............................. 439/110; 439/210; 174/98
(58) Field of Search ..................................... 439/110, 210, 439/212, 213, 115; 174/96, 99 R, 98, 70 B, 72 B, 88 B, 99 B

(56) References Cited

U.S. PATENT DOCUMENTS

| | | | |
|---|---|---|---|
| 3,894,170 | * 7/1975 | Schinzel | 174/99 B |
| 4,938,710 | * 7/1990 | Aihara et al. | 439/345 |
| 5,785,542 | * 7/1998 | Johnson | 439/210 |
| 5,869,786 | * 2/1999 | Jaakkola et al. | 174/96 |

FOREIGN PATENT DOCUMENTS 67 53 186    9/1968  (DE) .

OTHER PUBLICATIONS

Brochure published by Vahle, entitled "Sicherheits-Schleifleitungen" Jan. 1997.

Brochure published by Vahle, entited "Sicherheits-Schleifleitungen–MKL" 1996.

Brochure published by Mannesmann Demag Fördertechnik, entitled "Kompakt–Kleinschleifleitung DKK" Jun. 1993.

* cited by examiner

Primary Examiner—T. C. Patel
(74) Attorney, Agent, or Firm—Henry M. Feiereisen

(57) ABSTRACT

A connector for coupling two contact line segments positioned in end-to-end alignment and made of elongate plastic profiles for accommodating current conductor rails which cooperate with a current collector vehicle traveling inside the contact line segments, includes a coupling sleeve made of plastic material for positively enveloping the contact line segments in an area of their confronting ends, with the ends of the contact line segments being freely shiftable in a longitudinal direction within a predetermined range. The coupling sleeve is split in a direction transversely to the longitudinal direction so as to define two sleeve members which are detachably connected to one another, wherein one of the sleeve members can be placed on one of the confronting ends of the contact line segments and the other one of the sleeve members can be placed on the other one of the confronting ends of the contact line segments, before the contact line segments are joined.

8 Claims, 6 Drawing Sheets

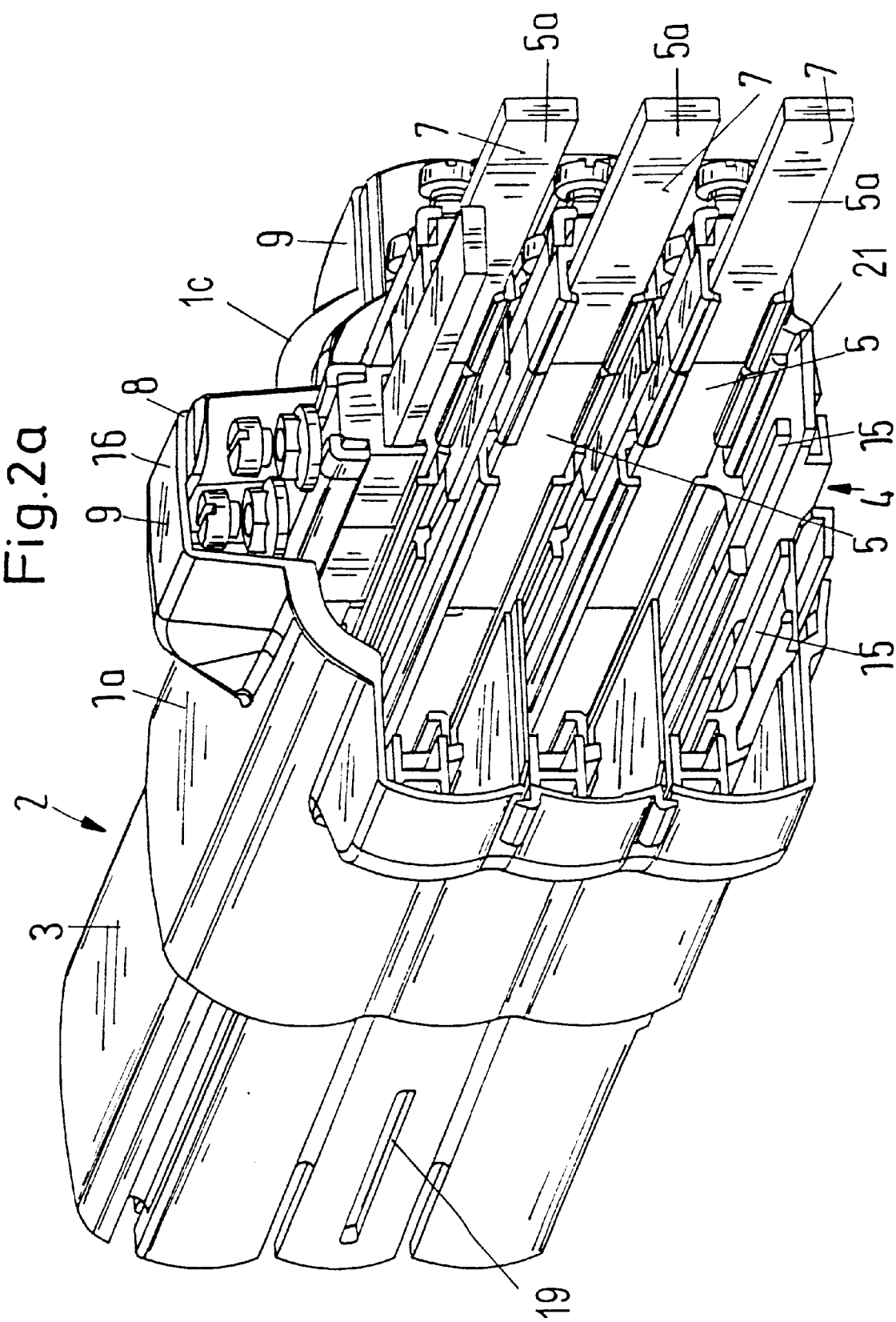

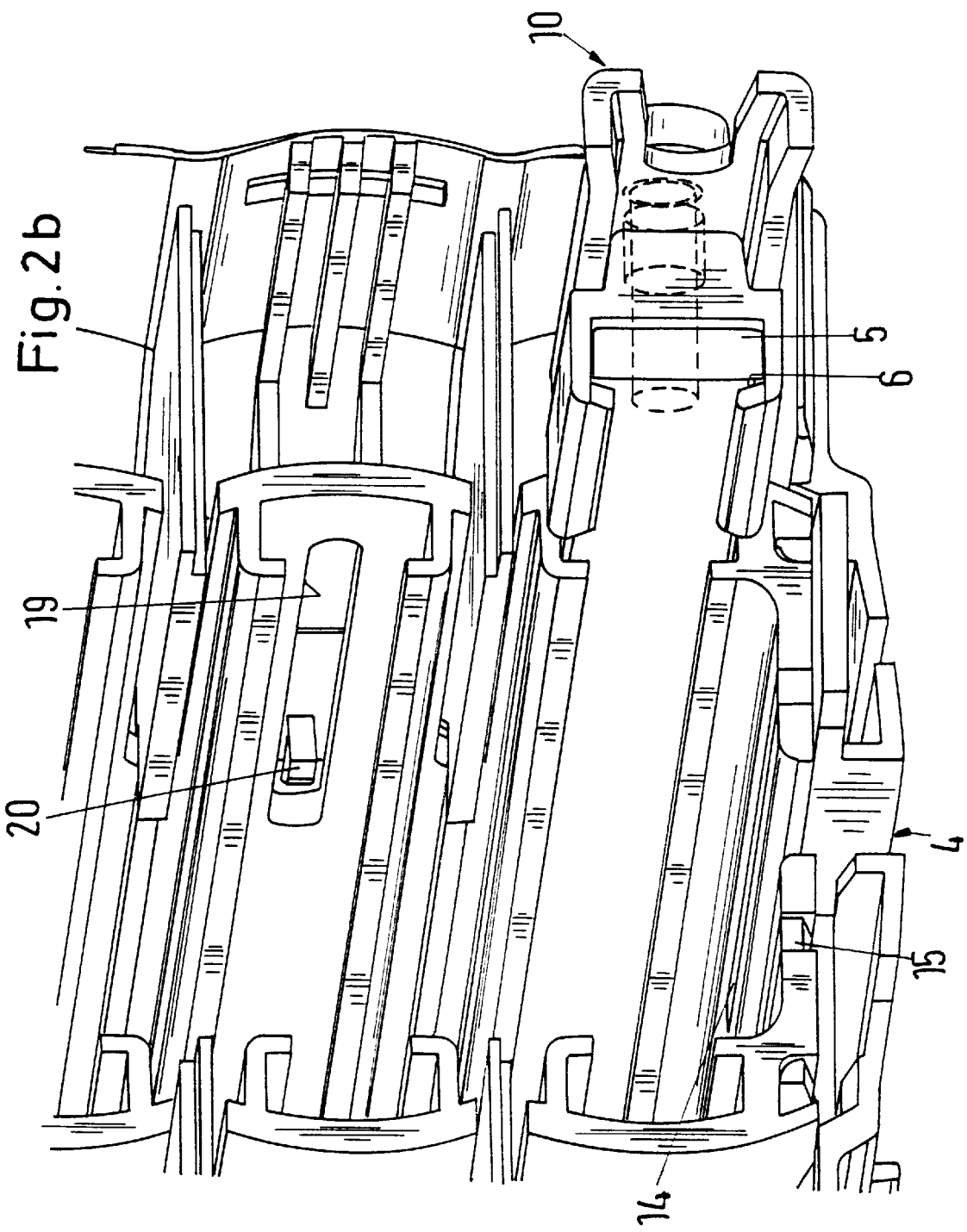

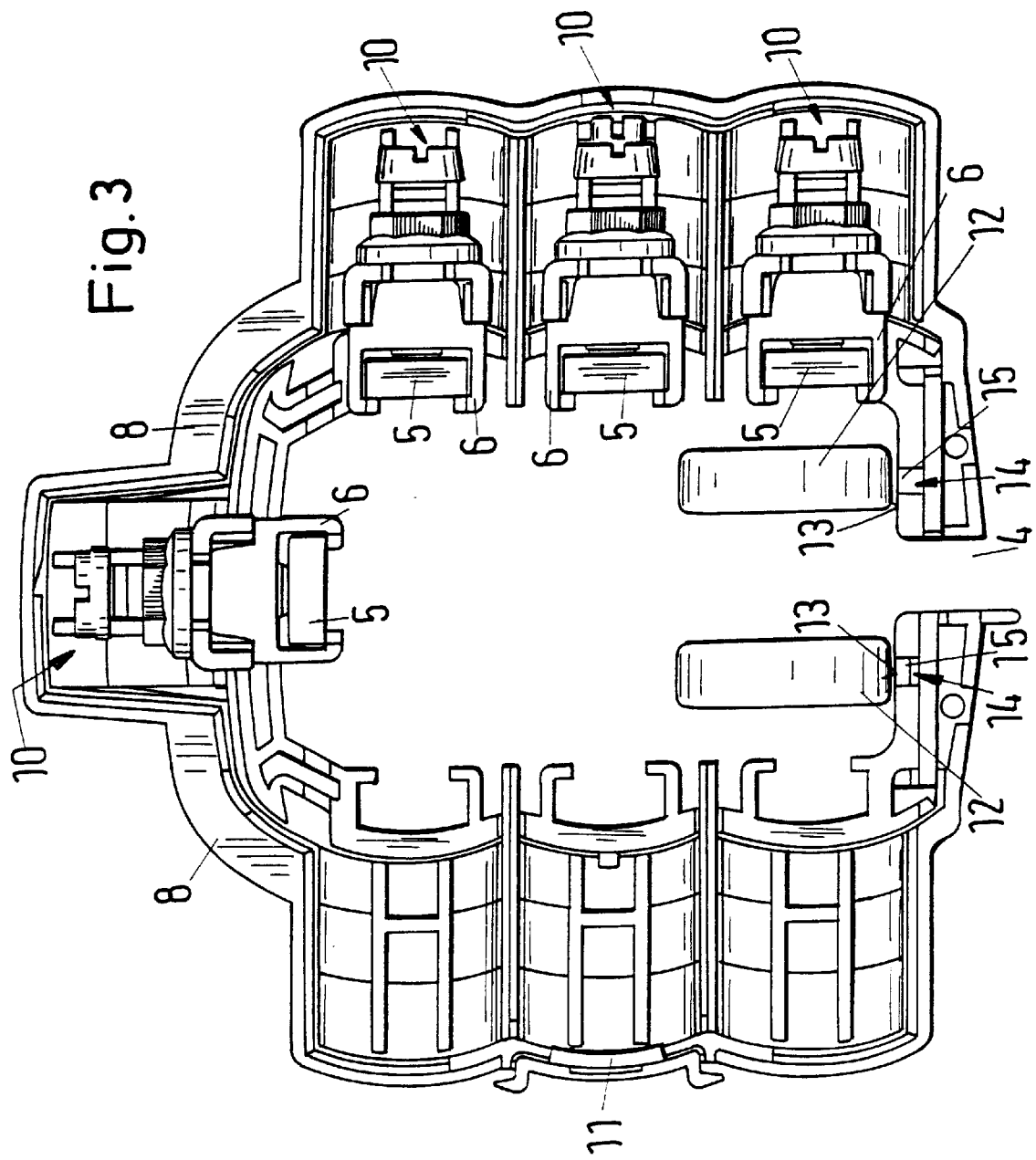

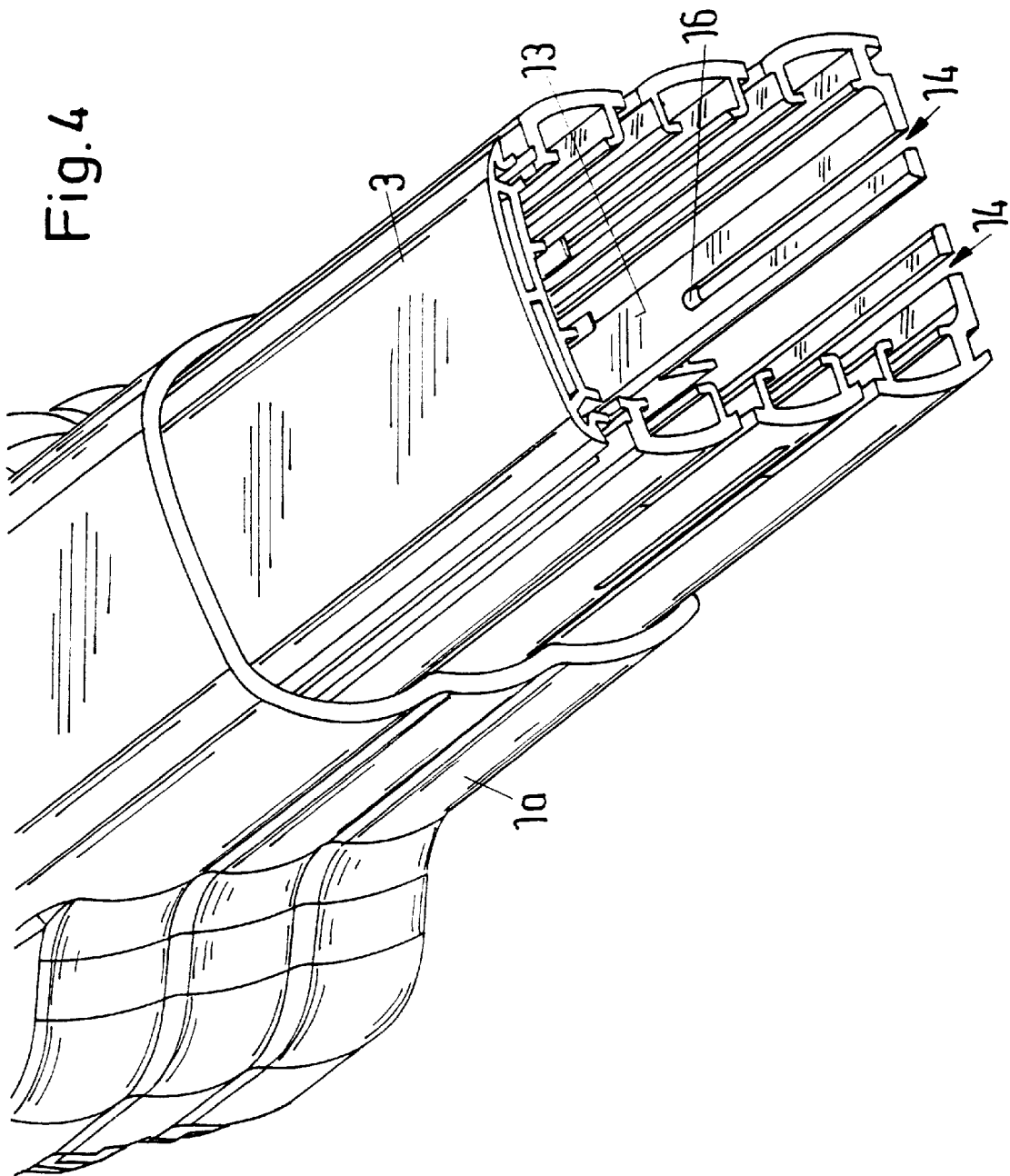

CONNECTOR FOR ELECTRICALLY COUPLING TWO CURRENT CONTACT LINE SEGMENTS IN END-TO END RELATIONSHIP

CROSS-REFERENCES TO RELATED APPLICATIONS

This application claims the priority of German Patent Application, Serial No. DE 198 07 792, filed Feb. 19, 1998, the subject matter of which is incorporated herein by reference.

BACKGROUND OF THE INVENTION

The present invention relates to a connector for coupling two contact line segments placed in end-to-end flush disposition and made of elongate profiles of plastic for accommodating current conductor rails which cooperate with a current collector traveling inside the contact line arrangement.

A publication, issued by the company Akapp and entitled "Multiconductor" discloses a current contact line arrangement which is comprised of separate contact line segments of pre-assembled lengths that are joined together by coupling sleeves. The contact line segments are made of elongate profiles of plastic to form a casing for receiving the current conductor rails. The placement of the contact line segments inside the coupling sleeves is realized in such a manner that the end faces of the confronting elongate plastic profiles and the end faces of confronting conductor rails abut one another in end-to-end disposition. The difference of the thermal expansion coefficients between conductor rail and plastic casing is compensated by expansion joints which are spaced apart at certain distances. The expansion joints are so configured that the elongate plastic profiles are in alignment at a distance from one another within each expansion joint. The differences in expansion encountered between the elongate plastic profiles during temperature fluctuations and added up along several contact line segments is thus compensated by the expansion gap formed by the expansion joints.

A drawback of this contact line arrangement is the need for separate expansion joints and the requirement to particularly design current collectors for traveling over the expansion gap, i.e. the current collectors must be designed of greater length and/or include an additional pair of wheels. Moreover, additional mountings and guides for the elongate plastic profiles become necessary.

Brochures published in 1997 and in 1996 by the company Paul Vahle GmbH & Co. KG and entitled "Sicherheits-Schleifleitungen" and "Sicherheits-Schlelfleitungen— MKL", respectively, describe the use of expansion pieces for compensating varying length expansions. These expansion joints are utilized in addition to coupling sleeves which join together the pre-assembled contact line segments. Also disadvantageous in these configurations is the need for the use of expansion pieces spaced from one another at defined distances.

From a brochure published in 1993 by Mannesmann Demag Fordertechnik AG and entitled "Kompakt-Kleinschleifleitung DKK", it is also known to use an expansion joint for contact line segments which are made of elongate plastic profiles and accommodate the current conductor rails and the current collectors of vehicles traveling in the plastic profiles. Confronting ends of the contact line segments are rectilinear in the transition zone and arranged in spaced-apart flush disposition. Moreover, the confronting ends of the contact line segments are provided with a funnel-shaped attachment to ensure a passage of the collector vehicle from one contact line segment to the succeeding contact line segment. The funnels of confronting ends of contact line segments are mirror images of one another and are spaced at a distance of few centimeters to compensate temperature-based length changes of the elongate plastic profiles. The distance between the funnels is so selected as to ensure a passage of two linked collector vehicles, with the funnels serving as guide for the linked collector vehicles on the inlet end. A drawback of this type of connector is the need for interrupting the conductor rails for safety reasons and the fact that only linked collector vehicles are able to pass the expansion gap.

SUMMARY OF THE INVENTION

It is thus an object of the present invention to provide an improved connector for coupling two contact line segments placed in end-to-end disposition, obviating the afore-stated drawbacks.

In particular, it is an object of the present invention to provide an improved connector for coupling two contact line segments placed in end-to-end disposition, which is free from any distortions and deformations despite varying thermal expansion coefficients between metal and plastic, in particular PVC.

These objects, and others which will become apparent hereinafter, are attained in accordance with the present invention by providing a coupling sleeve of plastic material for positively enveloping the contact line segments in an area of their confronting ends, with the ends of the contact line segments being freely shiftable in a longitudinal direction within a predetermined range, wherein the coupling sleeve is split in a direction transversely to the longitudinal direction so as to define two sleeve members which are detachably connected to one another, whereby one sleeve member can be placed on one of the confronting ends of the contact line segments and the other sleeve member can be placed on the other one of the confronting ends of the contact line segments, before the contact line segments are joined.

A connector in the form of a coupling sleeve in accordance with the present invention meets all safety aspects as the conductor rails extending through the contact line arrangement are covered by the coupling sleeve and thus made inaccessible from outside in the transition zone between the contact line segments. The ability of the elongate plastic profiles inside the coupling sleeve and/or of the coupling sleeve to freely move in longitudinal direction ensures that no mechanical warping or deformation occurs even when the thermal expansion coefficients between the metallic conductor rails and the elongate plastic profiles vary significantly.

The present invention is thus based on the teaching to provide a connector which not only reliably couples the current contact line segments but also compensates for expansions so that the need for separate expansion pieces or expansion joints, as typically incorporated conventionally and arranged in spaced-apart relationships inside the contact line segments, is eliminated. As a consequence of a detachable connection between the sleeve members of the coupling sleeve, the sleeve members can be placed over the confronting ends of the respective contact line segments before the contact line segments are joined together so that the contact line arrangement can be pre-assembled with the sleeve members. Thus, the sleeve members with attached contact lines can easily be joined to one another on site, e.g. by simply pushing the sleeve members together.

According to another feature of the present invention, the sleeve members of the coupling sleeve are so configured that their confronting end faces at the longitudinal edges of the sleeve members abut one another, thereby ensuring a complete protection from touching the required electrical contacts as the conductor rails are completely screened to the outside.

Suitably, in particular for reasons of stability, the longitudinal edges of one of the sleeve members extend tangentially relative to the longitudinal edges of the other one of the sleeve members.

According to another feature of the present invention, the two sleeve members are provided with complementary locking elements which so interact with one another as to realize the detachable connection between the sleeve members.

According to still another feature of the present invention, the sleeve members of the coupling sleeve have outwardly directed cambers in the coupling zone between successive sleeve members, with cambers of the sleeve members accommodating connecting assemblies for the conductor rails to thereby ensure a proper connection of the conductor rails.

Suitably, each of the elongate plastic profiles is formed with an oblong hole of predetermined length at its ends, with the coupling sleeve being formed with an inwardly directed protrusion for engagement in the oblong hole. As a consequence of this type of interlocking engagement, the ends of the elongate plastic profile cannot be pulled out from the coupling sleeve during operation.

A sufficient securement of the coupling sleeve can be realized by mounting both sleeve members at the conductor rail connecting assembly. Preferably, the conductor rail connecting assembly is so configured as to form a stop for the ends of the elongate plastic profiles.

In order to realize a smooth passage of the current collector vehicle along the contact sleeve, the elongate plastic profiles define an interior space which is formed in the longitudinal direction with a running surface for operation of the current collector vehicle, with the running surface being formed with a slot extending in the longitudinal direction in the end zone of the elongate plastic profiles and being at least partially filled by a bar which is formed on the coupling sleeve, wherein the plastic profiles are longitudinally displaceable with respect to the bar, and the bar exhibits a top side facing the current collector vehicle and extends flush with the plane of the running surface.

BRIEF DESCRIPTION OF THE DRAWING

The above and other objects, features and advantages of the present invention will now be described in more detail with reference to the accompanying drawing, in which:

FIG. 2a is a top, side and front perspective view of the sleeve member of FIG. 2 in connection with conductor rails of another contact line segment for attachment;

FIG. 2b is a cutaway perspective view, on an enlarged scale, of the sleeve member of FIG. 2 to show a safety mechanism to prevent inadvertent withdrawal of a plastic profile from the coupling sleeve;

FIG. 3 is a front elevational view of the coupling sleeve of FIG. 2; and

FIG. 4 is a top, side and front perspective view of the elongate plastic profile of one contact line section, received in the contact sleeve, showing in detail slots formed in the elongate plastic profile.

DETAILED DESCRIPTION OF PREFERRED EMBODIMENTS

Figure 1:
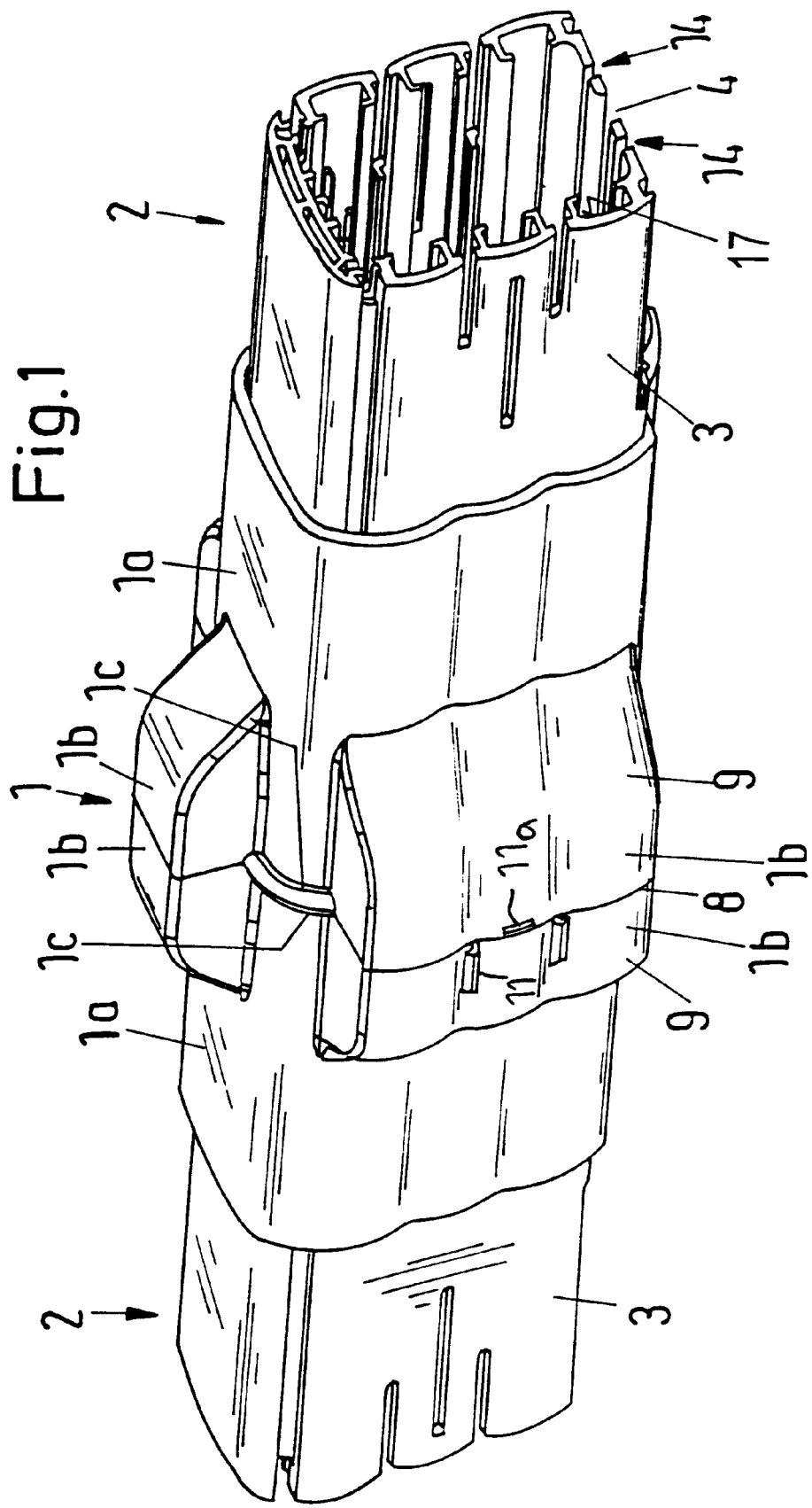
FIG. 1 is a top, side perspective view of a connector in the form of a coupling sleeve according to the present invention for connecting two successive contact lines in the form of elongate plastic profiles, showing the coupling sleeve in installed stage.

Throughout all the Figures, same or corresponding elements are generally indicated by same reference numerals.

Turning now to the drawing, and in particular to FIG. 1, there is shown a top, side perspective view of a coupling sleeve according to the present invention, generally designated by reference numeral 1 and connecting two successive contact line segments, generally designated by reference numeral 2 and provided in the form of elongate plastic profiles 3. The coupling sleeve 1 is made of plastic and split transversely to the longitudinal direction of the contact lines 2 so as to define two sleeve members 1a which are of substantially identical configuration to form a casing which envelopes in a form-fitting manner the inserted confronting ends of the contact line segments 2 to be connected. The sleeve members 1a are detachably mounted to one another by a locking mechanism in the form of complementary locking elements 11 (FIG. 3) and 11a (shown in FIG. 2 by way of undercut), positioned laterally on the side walls of the sleeve members 1a. In this manner, both sleeve members 1a of the coupling sleeve 1 can be detachably connected to one another by a suitable tool.

As will be described in more detail furtherbelow, the plastic profiles 3 are freely movable in longitudinal direction inside the coupling sleeve 1 in a predetermined range. The ends of the elongate plastic profiles 3 are received in flush engagement in the area of the coupling sleeve 1, with same plastic profiles opposing one another.

The sleeve members 1a are formed on the top surface and opposite side walls with outwardly directed cambers 9 and in immediate proximity to their longitudinal edges 1b in the area between the cambers 9 on the side walls and between the cambers 9 on the top surface with flanged sections 1c. Thus, the sleeve members 1a define confronting end faces 8 which closely abut one another when assembling the coupling sleeve 1, whereby the longitudinal edges 1b of one sleeve member 1a extend tangentially to the longitudinal edges 1b of the other sleeve member 1a, i.e. that the outer walls of both sleeve members 1a extend at the juncture of the end faces 8 parallel to the longitudinal direction of the contact line and thus have a common tangent.

The elongate plastic profiles 3 and the coupling sleeve 1 are formed on their bottom side with a longitudinal opening 4. In the installed stage, as shown in FIG. 1, the openings 4 of the plastic profiles 3 and the coupling sleeve 1 are in alignment to thereby form a continuous slot for feedthrough of a collector cable (not shown) of a current collector vehicle or trolley which travels on wheels 12 (FIG. 3) in the contact line arrangement 2 in longitudinal direction during operation, with the collector cable being connectable to an external current consumer.

Figure 2:
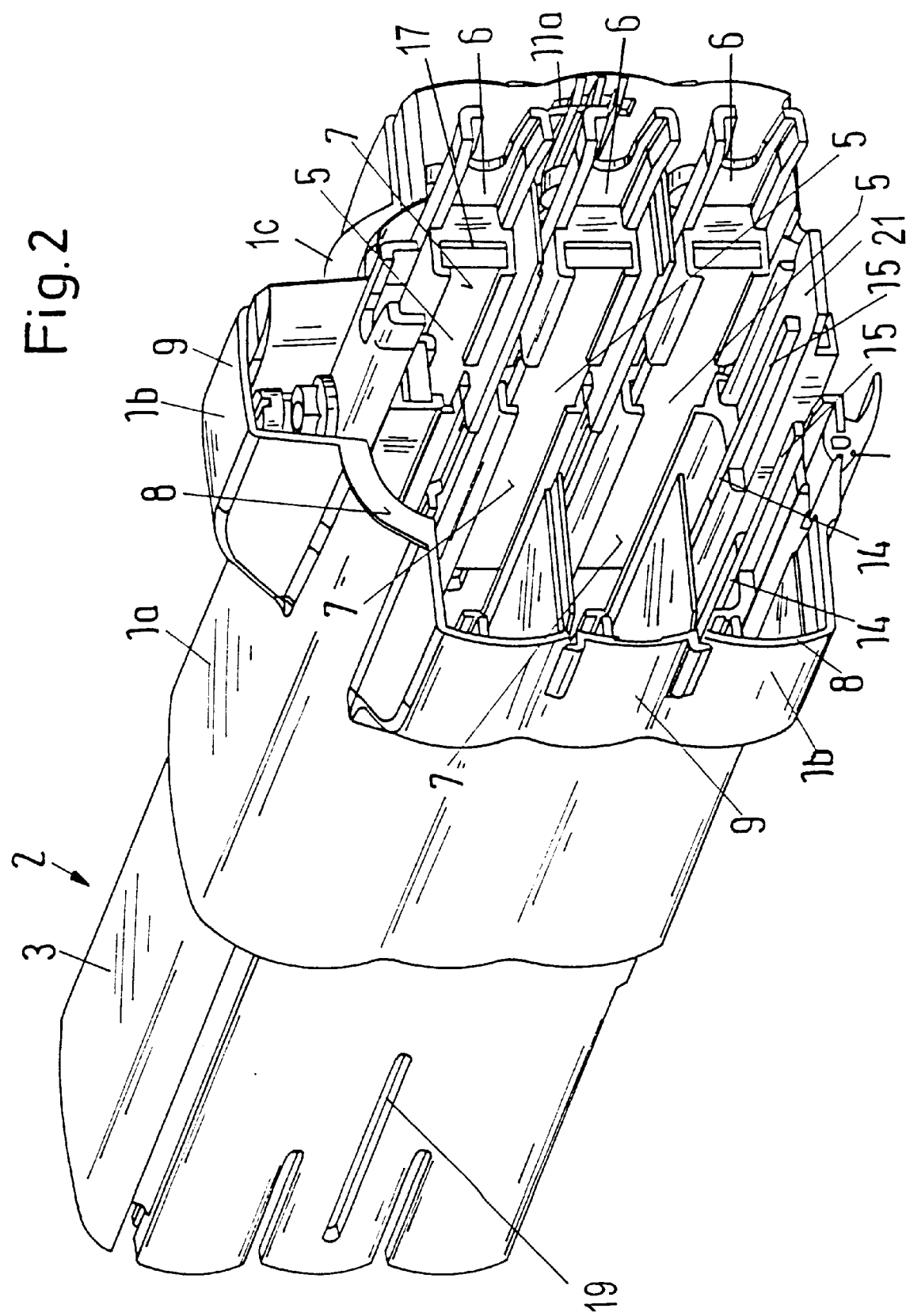
FIG. 2 is a top, side and front perspective view of a sleeve member of the coupling sleeve of FIG. 1, with the sleeve member being placed over a contact line segment.

Turning now to FIG. 2, there is shown a top, side and front perspective view of a sleeve member 1a of the coupling sleeve 1 of FIG. 1 in conjunction with an elongate plastic profile 3 to illustrate in more detail the interior thereof. Each plastic profile 3 is formed with substantially C-shaped anchoring grooves 17 (FIG. 1) for receiving respective conductor rails 5. In the nonlimiting example of the drawings, the conductor rails 5 have rectangular cross section. However, persons skilled in the art will understand that other cross sections are certainly within the scope of the present invention. In like manner, each sleeve member 1a is formed with substantially C-shaped anchoring grooves 6 which are in alignment with the anchoring grooves 17 of the plastic profiles 3 for receiving the conductor rails 5 and safeguarding the conductor rails 5 against a shift in transverse direction. The anchoring grooves 6 form part of pertaining screw-type connecting assemblies 10 by which the conductor rails 5 are securely placed in end-to-end disposition with the conductor rails 5a of the other contact line segment 2 to be coupled, as shown in FIG. 2 which illustrates the other contact line segment 2 only by way of the conductor rails 5. In the non-limiting example of the drawing, a total of seven connecting assemblies 10 are used; however, it will be appreciated by persons skilled in the art that the number of connecting assemblies may vary in accordance to the dimensions of the contact line arrangement and associated coupling sleeve, and thus the present invention should not be limited to the incorporation of seven connecting assemblies. As the thermal expansion coefficient of metal, in particular copper, is relatively low, the end-to-end disposition of the conductor rails 5, 5a does not pose any problems. In contrast thereto, the plastic profiles 3, which are typically made of PVC have a thermal expansion coefficient which is greater by the factor nine to twelve.

All of the conductor rails 5, 5a exhibit inwardly directed contact surfaces 7 along which collector shoes of the trolley slide to maintain contact, without interruption, with the conductor rails 5, 5a when the trolley travels through the contact line arrangement. Thus, the trolley is capable to conduct current at any location of the contact line arrangement to an intended consumer.

Turning now in particular in FIG. 3, there is shown a front elevational view of the end face of the contact line segment of FIG. 2. Schematically illustrated are two wheels 12 of the trolley, which travel along running surfaces 13 formed inwardly on the plastic profiles 3 and bounding the opening 4 on opposite sides thereof. Formed at the ends of the plastic profiles 3 are slots 14 which extend in longitudinal direction in each running surface 13 (FIG. 4) and have a width which is smaller than a width of the wheels 12. The slots 14 can be filled at least partially, otherwise completely, by guide ribs or bars 15 which are formed on platforms 21 of the sleeve members 1a and have such a length that a free space is left between an end of the bars 15 and the opposite slot end 16 (FIG. 4). Thus, the bars 15 engage in the slots 14 from below for displacement in the longitudinal direction and extend flush with the top side of the running surfaces 13 so that the plastic profiles 3 can shift relative to the bars 15 and the trolley can travel along the running surfaces 13, without interference by the bars 15. In this manner, even when the plastic profiles 3 change in length as a consequence of temperature fluctuations, the wheels 12 of the trolley travel smoothly through the coupling sleeve 1.

As shown in particular in FIG. 2b, the ends of the plastic profiles 3 are further provided laterally with an oblong hole 19 of predetermined length for engagement of a protrusion 20 extending inwardly from the coupling sleeve 1, thereby preventing an unintentional removal of the plastic profiles 3 from the coupling sleeve 1. This configuration also enables to design the coupling sleeve 1 of relatively short length. In the nonlimiting example of the drawing, the connecting assembly 10 serves also as an inner stop for the ends of the plastic profiles 3.

Persons skilled in the art will understand that the connector according to the present invention can also be used for conductor rails in the form of a continuous band after positioning the plastic profiles 3, i.e. to utilize the band feeding technique.

Before realizing a connection between two contact line segments 2, one sleeve member 1a is placed over the end of one contact line segment 2 and the other sleeve member 1a is placed over the end of the other coupling line segment 2, whereby the protrusions of the sleeve members 1a engage in the oblong holes in the contact line segments. A sufficient fixation of the coupling sleeve 1 is realized through attachment of the sleeve members 1a at the connecting assemblies 10. When being pushed together, the sleeve members 1a are thus connected by way of a positive engagement, and secured by the complementary locking elements 11, 11a.

While the invention has been illustrated and described as embodied in a connector for coupling two current contact line segments in end-to-end relationship, it is not intended to be limited to the details shown since various modifications and structural changes may be made without departing in any way from the spirit of the present invention.

What is claimed as new and desired to be protected by Letters Patent is set forth in the appended claims:

1. A connector for coupling two contact line segments positioned in end-to-end alignment and made of elongate plastic profiles for accommodating current conductor rails which cooperate with a current collector vehicle traveling inside the contact line segments, said connector including a coupling sleeve made of plastic material for positively enveloping the contact line segments in an area of their confronting ends, with the ends of the contact line segments being freely shiftable in a longitudinal direction within a predetermined range, said coupling sleeve being split in a direction transversely to the longitudinal direction so as to define two sleeve members, and including a locking means for detachably connecting the sleeve members to one another, with one of the sleeve members being adapted for placement on one of the confronting ends of the contact line segments and the other one of the sleeve members being adapted for placement on the other one of the confronting ends of the contact line segments, before the contact line segments are joined, wherein the elongate plastic profiles define an interior space which is formed in the longitudinal direction with a running surface for operation of the current collector vehicle, said running surface being formed with a slot extending in the longitudinal direction toward an end face of the elongate plastic profiles and at least partially filled by a bar formed on the coupling sleeve, said elongate plastic profiles being longitudinally displaceable with respect to the bar, said bar exhibiting a top side facing the current collector vehicle and extending flush with the plane of the running surface.

2. The connector of claim 1 wherein the sleeve members have confronting end faces at their longitudinal edges and are so configured that their end faces abut one another when the sleeve members are joined together.

3. The connector of claim 2 wherein the longitudinal edges of one of the sleeve members extend tangentially relative to the longitudinal edges of the other one of the sleeve members.

4. The connector of claim 1 wherein the locking means is formed by complementary locking elements formed on the sleeve members and so interacting with one another as to realize the detachable connection of the sleeve members.

5. The connector of claim 1 wherein the sleeve members have outwardly directed cambers in a connection zone between the sleeve members, and further comprising a plurality of connecting assemblies accommodated in the cambers of the sleeve members for securing the conductor rails in place.

6. The connector of claim 1 wherein the elongate plastic profiles have ends formed with an oblong hole of predetermined length, said coupling sleeve being formed with an inwardly directed protrusion for engagement in the oblong hole.

7. The connector of claim 5 wherein the sleeve members are secured to the connecting assembly.

8. The connector of claim 5 wherein the connecting assembly for the conductor rails is so configured as to form a stop for the ends of the elongate plastic profiles.

* * * * *